United States Patent [19]
Tomite et al.

[11] Patent Number: 5,083,054
[45] Date of Patent: Jan. 21, 1992

[54] PERMANENT MAGNET FIELD TYPE DC MACHINE

[75] Inventors: Tosio Tomite; Keiichi Nakatsugawa, both of Katsuta; Toshimi Abukawa, Hitachiota, all of Japan

[73] Assignee: Hitachi, Ltd., Tokyo, Japan

[21] Appl. No.: 550,585

[22] Filed: Nov. 10, 1983

[30] Foreign Application Priority Data

Nov. 13, 1982 [JP] Japan .................... 57-199228

[51] Int. Cl.$^5$ ............................ H02K 21/26
[52] U.S. Cl. ............................. 310/154; 310/258
[58] Field of Search ............ 310/44, 46, 152, 154, 310/254, 258; 335/296

[56] References Cited

U.S. PATENT DOCUMENTS

| | | | |
|---|---|---|---|
| 2,513,226 | 6/1950 | Wylie | 310/154 |
| 3,277,324 | 10/1966 | Beaudoin | 310/154 |
| 3,594,599 | 7/1971 | West | 310/258 |

FOREIGN PATENT DOCUMENTS

| | | | |
|---|---|---|---|
| 0023037 | 1/1981 | European Pat. Off. | 310/154 |
| 2550416 | 5/1977 | Fed. Rep. of Germany | 310/154 |
| 2267649 | 7/1975 | France | 310/154 |
| 0417355 | 5/1947 | Italy | 310/154 |
| 0428130 | 12/1947 | Italy | 310/154 |
| 0071466 | 6/1981 | Japan | 310/154 |

OTHER PUBLICATIONS

Electrical Engineering in Japan; vol. 108; 01–02, 1986, Scripta Techica, Inc.

Primary Examiner—R. Skudy
Attorney, Agent, or Firm—Antonelli Terry Stout & Kraus

[57] ABSTRACT

A permanent magnet field type DC machine in which the amount of flux from field poles is changed by effective use of armature reaction thereby to improve characteristics of the DC machine. There is provided a permanent magnet field type DC machine having field poles formed of permanent magnet members and auxiliary magnetic pole members of high permeability which are provided in parallel with each other in the direction of rotation on the peripheral surface of a yoke to oppose an armature with an air gap therebetween, the auxiliary magnetic pole members being magnetized by armature reaction thereby to change the total amount of field magnetic flux from the field poles, wherein the gap between the auxiliary magnetic pole members and armature is selected to be smaller than that between the permanent magnet members and armature, thereby decreasing the reluctances in the paths of the auxiliary magnetic pole members, so that the armature reaction can be effectively used.

11 Claims, 2 Drawing Sheets

PERMANENT MAGNET FIELD TYPE DC MACHINE

This invention relates to permanent magnet field type DC machine, and particularly to one in which the amount of flux-from field poles is changed by use of armature reaction to thereby improve characteristics of the machine.

The permanent magnet field type DC motor generally has the characteristics of a shunt motor. In order to further add the characteristics of a series motor, the field poles are formed of permanent magnet members and auxiliary magnetic pole members of high permeability, so that the flux passing through the auxiliary magnetic pole members is increased by magnetizing action of armature reaction to increase the amount of field flux, and thus to increase the output torque at the time of large load, which fact is already known. In addition, if the flux depending on the demagnetizing action of armature reaction is passed through the auxiliary magnetic pole members, the amount of field flux can be reduced in response to the load current and thus it is possible to produce the permanent magnet field type generator having such a voltage drop characteristic as in the welding generator.

These techniques mentioned above are described in detail in the specification of U.S. Pat. No. 3,594,599.

The stator of the conventional permanent magnet field type DC machine is formed of a yoke worked to have a predetermined size, auxiliary magnetic pole members produced by drawing of a piece of soft steel worked to have a certain size or by cold working thereof, and permanent magnet members produced by cutting the main outer portion of the fired material, these auxiliary magnetic pole members and permanent magnet members being securely mounted in parallel on the inner peripheral surface of the yoke.

In the DC machine using such stator the field poles of which are opposed through an air gap to the armature, however, the air gap, although small gap is advantageous, is difficult to be made small because the size of the permanent magnet such as fired ferrite magnet is low in its precision. Particularly, the ferrite magnet produced by such process as sintering which is excellent for mass production has large tolerance in thickness, axial bend, out of roundness and so on, and thus the gap must be large enough to prevent the interference of this large tolerance. In order to make the size of field poles have high precision, it is necessary to make finish machining the field poles after securely mounting them to the yoke. However, since the ferrite magnets for the permanent magnet members are too hard and fragile to be cut, a whetstone with diamond particles adhered to its surface must be used for grinding the magnets. In addition, when the auxiliary magnetic pole members are also ground by this whetstone, they clog the whetstone because the material is soft. Thus, the inner diameter of the auxiliary magnetic pole members must be selected to be larger than that of the permanent magnet members. This results in large gap between the auxiliary magnetic pole member and armature and hence large reluctance, which disables the armature reaction for being effectively used.

Accordingly, it is an object of this invention to provide a permanent magnet field type DC machine having field poles capable of making effective use of the armature reaction.

According to this invention, there is provided a permanent magnet field type DC machine having field poles formed of permanent magnet members and auxiliary magnetic pole members of high permeability which are provided in parallel with each other in the direction of rotation on the peripheral surface of a yoke to oppose an armature with an air gap therebetween, the auxiliary magnetic pole members being magnetized by armature reaction thereby to change the total amount of field magnetic flux from the field poles, wherein the gap between the auxiliary magnetic pole members and armature is selected to be smaller than that between the permanent magnet members and armature, thereby decreasing the reluctances in the paths of the auxiliary magnetic pole members so that the armature reaction can be effectively used. In the DC machine with its armature opposing the inside of such field poles, the diameter of the auxiliary magnetic members is smaller than that of the permanent magnet members, while in the DC machine with its armature opposing the outside of the field poles, the diameter of the auxiliary magnetic pole members is larger than that of the permanent magnet members. Therefore, under the condition that the field poles are fixed to the yoke, only the auxiliary magnetic pole members can easily be cut to a small size with high precision.

The present invention will be apparent from the following detailed description taken in conjunction with the accompanying drawings, in which.

An embodiment of this invention will be described with reference to FIGS. 1 to 3.

Figure 1:
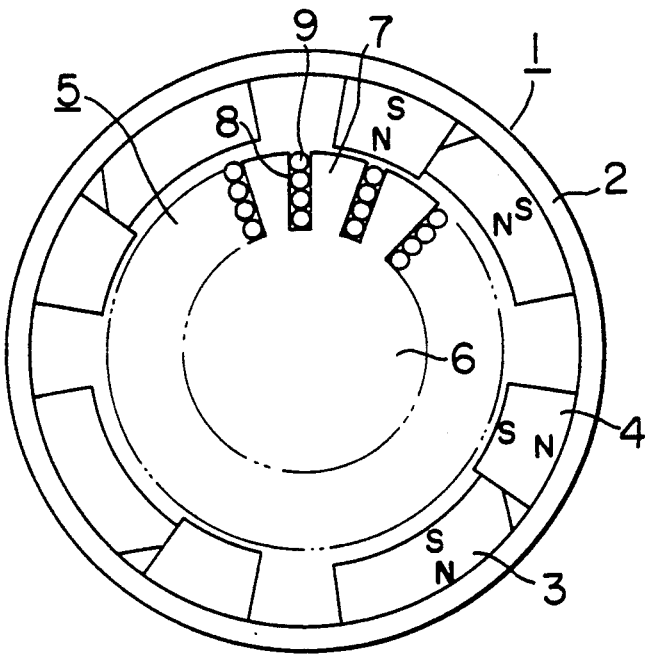
FIG. 1 is a front view of a main part of an embodiment of a permanent magnet field type DC machine of this invention.

FIG. 1 shows a example of a DC motor with its armature disposed inside the field poles. A stator 1 as illustrated includes a cylindrical yoke 2, permanent magnet members 3 and high-permeability auxiliary magnetic pole members 4, both members being arranged in parallel and securely bonded with an adhesive to the inner peripheral surface of the yoke 2. These permanent magnetic members 3 and auxiliary magnetic pole members 4 extend in the axial direction and form four field poles. In this embodiment, the permanent magnet members 3 are placed in the demagnetizing region of armature reaction, and the auxiliary magnetic pole members 4 in the magnetizing region thereof. An armature 5 disposed inside the field poles of the stator 1 includes a laminated iron core 6 with teeth 7 and grooves 8 on its outer periphery and an armature winding 9 in the grooves 8. The gap between the permanent magnet members 3 and armature 5 opposed to each other is narrow and may be as large as 0.5 mm which is enough to use the permanent magnet members 3 of the tolerance (0 to 0.25 mm) that can be produced at low cost. The gap between the auxiliary magnetic pole members 4 and armature 5 opposed to each other is selected to be about 0.4 mm which is smaller than the gap between the permanent magnet members and armature, by considering that the auxiliary magnetic pole members 4 of the tolerance (0 to 0.05 mm) can be produced by inexpensive cutting work.

As illustrated in FIG. 1, each of the permanent magnet members 3 is magnetized in a pole direction of a radius of the armature core 6 such that the portion of the permanent magnet member 3 adjacent the gap and opposing the armature core is of N or S magnetic polarity and the portion of the permanent magnet member 3 adjacent to the yoke 2 is of the opposite magnetic polarity. Similarly, each of the auxiliary magnetic pole members 4 is magnetized in a pole direction of a radius of the armature core. Further, as illustrated in FIG. 1, each of the auxiliary magnetic pole members is disposed adjacent a circumferential end of an associated permanent magnet member and spaced from an opposite circumferential end of another permanent magnet member. That is, the auxiliary magnetic pole members are disposed only adjacent portions of the permanent magnet members at which flux density is increased by armature reaction.

Figure 2:
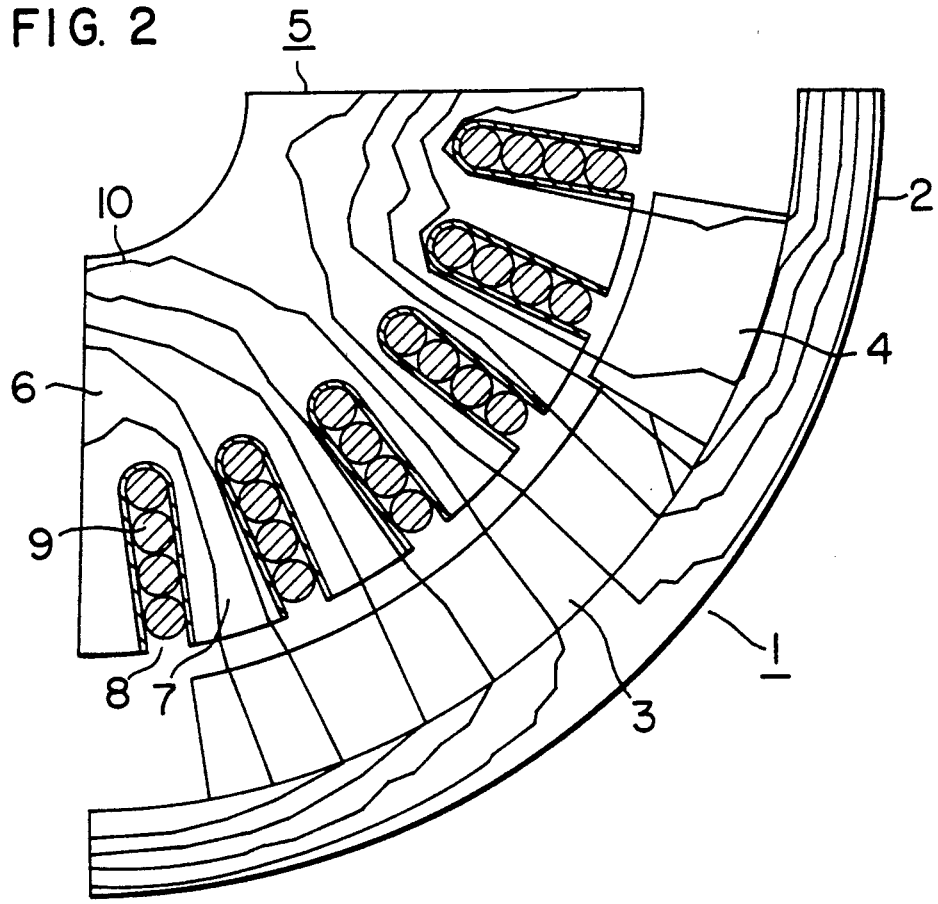
FIG. 2 shows the distribution of flux for small armature current in FIG. 1.
Figure 3:
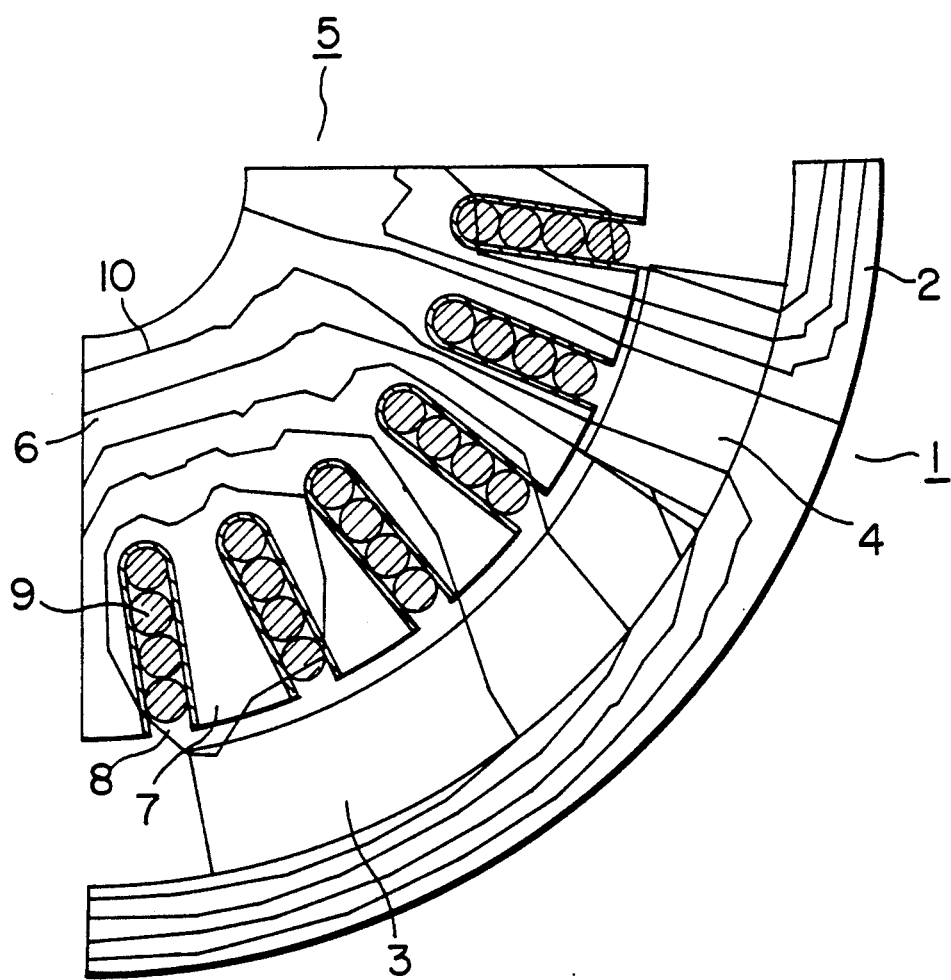
FIG. 3 shows the distribution of flux for large armature current in FIG. 1.

FIGS. 2 and 3 show the flux distributions of the DC motor for small load current and large load current, respectively, as a result of analysis by finite factor method. From FIGS. 2 and 3, it will be understood that at large load current a large amount of flux (magnetic lines of force 10) passes the auxiliary magnetic pole members 4 in the magnetizing region of armature reaction, and therefore the magnetizing effect will be increased if the gap between the auxiliary magnetic pole members and the armature is decreased for small reluctance. In addition, at large load current, the permanent magnet members 3 undergo small demagnetizing action, and thus its irreversible demagnetizing strength is never reduced because the gap between the permanent magnet members and the armature is large, thus offering large reluctance in the magnetic path.

This DC motor can produce high output torque without reduction of the irreversible demagnetizing strength.

If the shape of the permanent magnet members is determined so that the gap between the permanent magnet members and armature is increased as it goes near the demagnetizing-side end but decreased as it goes near the magnetizing-side end as provided in FIG. 1, for example, the torque characteristic and demagnetizing strength are further improved.

While in the above embodiment the auxiliary magnetic pole members used are of a bar-like shape, they may be formed integrally with the yoke 2 by casting, or by pressing a steel plate.

According to this invention, since the gap between the auxiliary magnetic pole members and the armature is selected to be smaller than that between the permanent magnet members and the armature, it is possible to produce the DC machine making effective use of the armature reaction. In addition, the DC machine has a high productivity since the gap between the permanent magnet members and the armature is large, and it can be produced at low cost since the auxiliary magnetic pole members can be easily worked to high-precision size.

We claim:

1. A permanent magnet field type DC machine comprising:
 a plurality of spaced permanent magnet members fixed to the inner peripheral surface of a cylindrical yoke so that said permanent magnet members oppose an armature core with a narrow gap therebetween, each of said permanent magnet members being magnetized in a pole direction of a radius of said armature core; and
 auxiliary magnetic pole members disposed only adjacent to portions of said permanent magnet members at which flux density is increased by armature reaction, said auxiliary magnetic pole members being disposed to oppose said armature core with a gap at least narrower than said narrow gap between said permanent magnet members and said armature core for enabling increase of magnetizing effect at large load current.

2. A permanent magnet field type DC machine according to claim 1, wherein said auxiliary magnetic pole members are formed integral with the yoke.

3. A permanent magnet field type DC machine according to claim 1, wherein said auxiliary magnetic pole members are pressed steel plate auxiliary magnetic pole members.

4. A permanent magnet field type DC machine according to claim 1, wherein each of said auxiliary magnetic pole members is magnetized in a pole direction of a radius of said armature core.

5. A permanent magnet field type DC machine according to claim 1, wherein said auxiliary magnetic pole members are disposed to oppose said armature core with said gap narrower than said narrow gap between said permanent magnetic members and said armature core so that at large load current, a large amount of flux passes said auxiliary magnetic pole members in the magnetizing region of armature reaction thereby enabling increase in the magnetizing effect with the narrow gap between said permanent magnet members and said armature core enabling substantially no reduction in an irreversible demagnetizing strength so as to provide the DC machine with high output torque.

6. A permanent magnet field type DC machine according to claim 1, wherein said permanent magnet members are disposed with respect to said armature core, and said auxiliary magnetic pole members are disposed with respect to said armature core so that in response to increase of the current, magnetic flux passing through a region of said permanent magnet members decreases, and magnetic flux passing through a region of said auxiliary magnetic pole members increases.

7. A permanent magnet field type DC machine according to claim 1, wherein said permanent magnet members have a surface opposing said armature core which is a non-machined surface, and said auxiliary magnetic pole members have a surface opposing said armature core which is a machineable surface.

8. A permanent magnet field type DC machine comprising:
 a plurality of spaced permanent magnet members fixed to the inner peripheral surface of a cylindrical yoke so that said permanent magnet members oppose an armature core with a narrow gap therebetween, each of said permanent magnet members being magnetized in a pole direction of a radius of said armature core; and
 auxiliary magnetic pole members disposed only adjacent to portions of said permanent magnet members at which flux density is increased by armature reaction, said auxiliary magnetic pole members being disposed to oppose said armature core with a gap at least narrower than said narrow gap between said permanent magnet members and said armature core,
 wherein said gap between each of said permanent magnet members and said armature core is increased as it goes near a demagnetization-side end but decreased as it goes near a magnetizing-side end.

9. A permanent magnet field type DC machine comprising:

a plurality of spaced permanent magnet members fixed to the inner peripheral surface of a cylindrical yoke so that said permanent magnet members oppose an armature core with a narrow gap therebetween, each of said permanent magnet members being magnetized in a pole direction of a radius of said armature core; and auxiliary magnetic pole members disposed only adjacent to portions of said permanent magnet members at which flux density is increased by armature reaction, said auxiliary magnetic pole members being disposed to oppose said armature core with a gap at least narrower than said narrow gap between said permanent magnet members and said armature core, wherein each of said auxiliary magnetic pole members is disposed adjacent a circumferential end of an associated permanent magnet member and spaced from an opposite circumferential end of another permanent magnet member.

10. A permanent magnet field type DC machine according to claim 9, wherein said permanent magnet members are disposed with respect to said armature core, and said auxiliary magnetic pole members are disposed with respect to said armature core so that in response to increase of the current, magnetic flux passing through a region of said permanent magnet members decreases, and magnetic flux passing through a region of said auxiliary magnetic pole members increases.

11. A permanent magnet field type DC machine according to claim 9, wherein said permanent magnet members have a surface opposing said armature core which is a non-machined surface, and said auxiliary magnetic pole members have a surface opposing said armature core which is a machineable surface.

* * * * *